(12) United States Patent
Hu et al.

(10) Patent No.: US 12,377,908 B2
(45) Date of Patent: Aug. 5, 2025

(54) HYDRAULIC STEERING SYSTEM AND TRAVELING CRANE

(71) Applicant: Xuzhou Heavy Machinery Co., Ltd., Xuzhou (CN)

(72) Inventors: Xiaodong Hu, Xuzhou (CN); Tao Zhu, Xuzhou (CN); Jianchun Yang, Xuzhou (CN); Xiuzhi Ren, Xuzhou (CN); Xiaojie Du, Xuzhou (CN)

(73) Assignee: Xuzhou Heavy Machinery Co., Ltd., Xuzhou (CN)

( * ) Notice: Subject to any disclaimer, the term of this patent is extended or adjusted under 35 U.S.C. 154(b) by 338 days.

(21) Appl. No.: 17/923,520

(22) PCT Filed: May 6, 2020

(86) PCT No.: PCT/CN2020/088837
§ 371 (c)(1),
(2) Date: Nov. 4, 2022

(87) PCT Pub. No.: WO2021/223120
PCT Pub. Date: Nov. 11, 2021

(65) Prior Publication Data
US 2023/0182808 A1    Jun. 15, 2023

(51) Int. Cl.
*B62D 5/20*    (2006.01)
*B62D 5/09*    (2006.01)
*B66C 23/62*    (2006.01)

(52) U.S. Cl.
CPC ............ *B62D 5/20* (2013.01); *B62D 5/09* (2013.01); *B66C 23/62* (2013.01); *B66C 2700/0378* (2013.01)

(58) Field of Classification Search
CPC ............ B62D 5/20; B62D 5/09; B62D 5/091
See application file for complete search history.

(56) References Cited

U.S. PATENT DOCUMENTS 3,486,576 A    12/1969    Breon et al.
3,881,567 A *   5/1975    Leiber .................. G05D 1/0265
                                                    180/422

(Continued)

FOREIGN PATENT DOCUMENTS

CN    201784677 U    4/2011
CN    201961369 U    9/2011

(Continued)

OTHER PUBLICATIONS

Chinese Office Action mailed on Mar. 24, 2021, for Chinese Patent Application No. 202010373595.0, filed on May 6, 2020, 12 total pages (with English Translation).

(Continued)

*Primary Examiner* — Valentin Neacsu
*Assistant Examiner* — Hosam Shabara
(74) *Attorney, Agent, or Firm* — COOLEY LLP

(57) ABSTRACT

A hydraulic steering system, comprising a steering pump and a plurality of digital steering cylinder assemblies. Each digital steering cylinder assembly includes a steering cylinder and a digital hydraulic valve configured to selectively communicate a rodless cavity of the steering cylinder with one of the steering pump and a return oil circuit, and communicate a rod cavity of the steering cylinder with the other of the steering pump and the return oil circuit. A controller can be configured to emit a digital pulse signal to a motor and cause the digital hydraulic valve to move towards a first working position or a second working position. A mechanical feedback structure can be configured to be driven by a piston rod of the steering cylinder when the valve core of the digital hydraulic valve moves towards the first working position or the second working position, so as to drive the digital hydraulic valve to return to a neutral (Continued)

position. The system can improve the control precision and the response speed of the steering system.

9 Claims, 2 Drawing Sheets

(56) References Cited

U.S. PATENT DOCUMENTS

| | | | |
|---|---|---|---|
| 4,398,616 A * | 8/1983 | Braden | B62D 7/1509 |
| | | | 180/414 |
| 4,558,759 A | 12/1985 | Baatrup et al. | |
| 5,230,399 A * | 7/1993 | Plate | B62D 5/097 |
| | | | 180/414 |
| 5,947,228 A | 9/1999 | Rolando | |
| 7,364,482 B1 | 4/2008 | Wong et al. | |
| 10,870,445 B2 * | 12/2020 | Bernau | B62D 5/30 |
| 12,043,326 B2 * | 7/2024 | Biagi | F15B 15/20 |

FOREIGN PATENT DOCUMENTS

| | | | | |
|---|---|---|---|---|
| CN | 102351004 | A | | 2/2012 |
| CN | 202345756 | U | | 7/2012 |
| CN | 103895700 | A | | 7/2014 |
| CN | 104608819 | A | * | 5/2015 |
| CN | 104608819 | B | | 11/2016 |
| CN | 106926897 | A | | 7/2017 |
| CN | 108556808 | A | | 9/2018 |
| CN | 109131548 | A | | 1/2019 |
| CN | 110509990 | A | | 11/2019 |
| CN | 111043099 | A | | 4/2020 |
| CN | 111098919 | A | | 5/2020 |
| CN | 111497935 | A | | 8/2020 |
| WO | WO-2013/165737 | A2 | | 11/2013 |
| WO | WO-2013/165737 | A3 | | 11/2013 |
| WO | WO-2014047874 | A1 | * | 4/2014 ............... B62D 5/06 |
| WO | WO-2021223120 | A1 | | 11/2021 |

OTHER PUBLICATIONS

Chinese Office Action mailed on Aug. 23, 2021, for Chinese Patent Application No. 202010373595.0, filed on May 6, 2020, 12 total pages (with English Translation).
Chinese Office Action mailed on Nov. 24, 2021, for Chinese Patent Application No. 202010373595.0, filed on May 6, 2020, 6 total pages (with English Translation).
Chinese Search Report mailed on Mar. 16, 2021, for Chinese Patent Application No. 202010373595.0, filed on May 6, 2020, 6 total pages (with English Translation).
International Search Report mailed on Jan. 27, 2021, for PCT Application No. PCT/CN2020/088837, filed on May 6, 2020, 8 pages (with English Translation).
Witten Opinion of the International Searching Authority mailed on Jan. 27, 2021, for PCT Application No. PCT/CN2020/088837, filed on May 6, 2020, 8 pages (with English Translation).
Zhang Yaowu (Feb. 28, 2014). Chapter V Hydraulic Control Components. The First Hydraulic Technology, China Railway Publishing House, pp. 69-104 (with English Translation).
Extended European Search Report mailed on Jan. 17, 2024, for EP Application No. 20 934 630.3, 11 pages.
Princemfgcorp (Jul. 15, 2015). "Smart cylinders: The future of precision hydraulics," Youtube Video Retrieved on Dec. 20, 2023, Located at www.youtube.com/watch?app=desktop&v=UGhxeZdTLeM.

* cited by examiner

HYDRAULIC STEERING SYSTEM AND TRAVELING CRANE

CROSS-REFERENCE TO RELATED APPLICATIONS

This application is a U.S. National Phase Application, filed under 35 U.S.C. § 371 (c), of International Application No. PCT/CN2020/088837, filed May 6, 2020, the contents of which is incorporated by reference herein in its entirety for all purposes.

FIELD OF THE INVENTION

The present disclosure relates to the field of construction machinery, in particular to a hydraulic steering system and a traveling crane.

DESCRIPTION OF RELATED ART

In a multi-axle vehicle, that is, a vehicle with two or more steering axles, such as a large-tonnage or overlarge-tonnage traveling crane, to achieve such operations as steering of a minimum steering radius, crabbing, independent steering of a rear axle and locked steering of middle and rear axles during traveling, it needs to use a hydraulic steering system in which steering wheels are independent from each other.

A relevant hydraulic independent steering system is generally composed of a steering pump, a steering control valve, steering cylinders and a neutral-position locking cylinder, etc. Each steering wheel is equipped with a steering cylinder, and the steering control valve controls different operations of corresponding steering cylinders and a locking state of the neutral-position locking cylinder, to achieve different steering modes of the multi-axle vehicle.

SUMMARY OF THE INVENTION

In an aspect of the present disclosure, a hydraulic steering system is provided, including:
  a steering pump; and
  a plurality of digital steering cylinder assemblies, wherein at least one of the plurality of digital steering cylinder assemblies includes:
   a steering cylinder
   a digital hydraulic valve having a valve core, configured to selectively communicate a rodless cavity of the steering cylinder with one of the steering pump and a return oil circuit, and communicate a rod cavity of the steering cylinder with the other of the steering pump and the return oil circuit;
   a motor in driving connection with the valve core of the digital hydraulic valve, and configured to receive a digital pulse signal and cause the valve core of the digital hydraulic valve to move towards a first working position or a second working position; and
   an internal feedback structure connected between a piston rod of the steering cylinder and the valve core of the digital hydraulic valve, and configured to, when the valve core of the digital hydraulic valve moves towards the first working position or the second working position, be moved by the piston rod of the steering cylinder to drive the valve core of the digital hydraulic valve to move towards a neutral position.

In some embodiments, the hydraulic steering system further includes:
  a sensor assembly configured to detect a stroke of the steering cylinder; and
  a controller built in at least one of the plurality of digital steering cylinder assemblies or communicatively connected to the motor and the sensor assembly in the digital steering cylinder assembly, and configured to, when a detection result from the sensor is greater than a preset stroke, emit a digital pulse signal to drive the valve core of the digital hydraulic valve to move toward the neutral position.

In some embodiments, the digital hydraulic valve is connected to the steering cylinder through the internal feedback structure, the digital hydraulic valve having a first working oil port communicated with the rod cavity of the steering cylinder and a second working oil port communicated with the rodless cavity of the steering cylinder, the internal feedback structure including:
  an internal feedback structure, two ends of which are in driving connection with an inner hole of the piston rod and a side of the valve core close to the second working oil port, respectively.

In some embodiments, the digital hydraulic valve has a first working oil port communicated with the rod cavity of the steering cylinder and a second working oil port communicated with the rodless cavity of the steering cylinder, and the internal feedback structure includes:
  a piston structure, two ends of which are connected to a rodless cavity side of the piston rod and a side of the valve core close to the second working oil port, respectively.

In some embodiments, the digital hydraulic valve is adjacent to the steering cylinder, and the digital hydraulic valve, the steering cylinder and the internal feedback structure are arranged integratedly.

In some embodiments, the digital pulse signal includes at least one of a pulse number signal and a pulse frequency signal, and the controller is configured to control, by the pulse number signal, a displacement of the valve core of the digital hydraulic valve, or control, by the pulse frequency signal, a speed of the valve core of the digital hydraulic valve.

In some embodiments, the sensor assembly includes:
  a connection conversion device fixedly connected to the piston rod of the steering cylinder; and
  at least one of a speed sensor and a displacement sensor to obtain the stroke of the steering cylinder by detecting at least one of a speed and a displacement of the connection conversion device and performing conversion.

In some embodiments, the hydraulic steering system further includes:
  a coupling in transmission connection between the motor and the valve core of the digital hydraulic valve.

In another aspect of the present disclosure, there is provided a traveling crane, including a hydraulic steering system in any embodiment described above.

In some embodiments, the plurality of digital steering cylinder assemblies include a first digital steering cylinder assembly, a second digital steering cylinder assembly, a third digital steering cylinder assembly and a fourth digital steering cylinder assembly communicated with the same steering pump and the same return oil circuit to independently control four steering wheels of the crane, respectively.

BRIEF DESCRIPTION OF THE DRAWINGS

Drawings illustrated herein are used for providing further understanding of the present disclosure and form part of the present disclosure, and illustrative embodiments of the present disclosure and description thereof are intended for explaining instead of improperly limiting the present disclosure. In the drawings.

Figure 1:
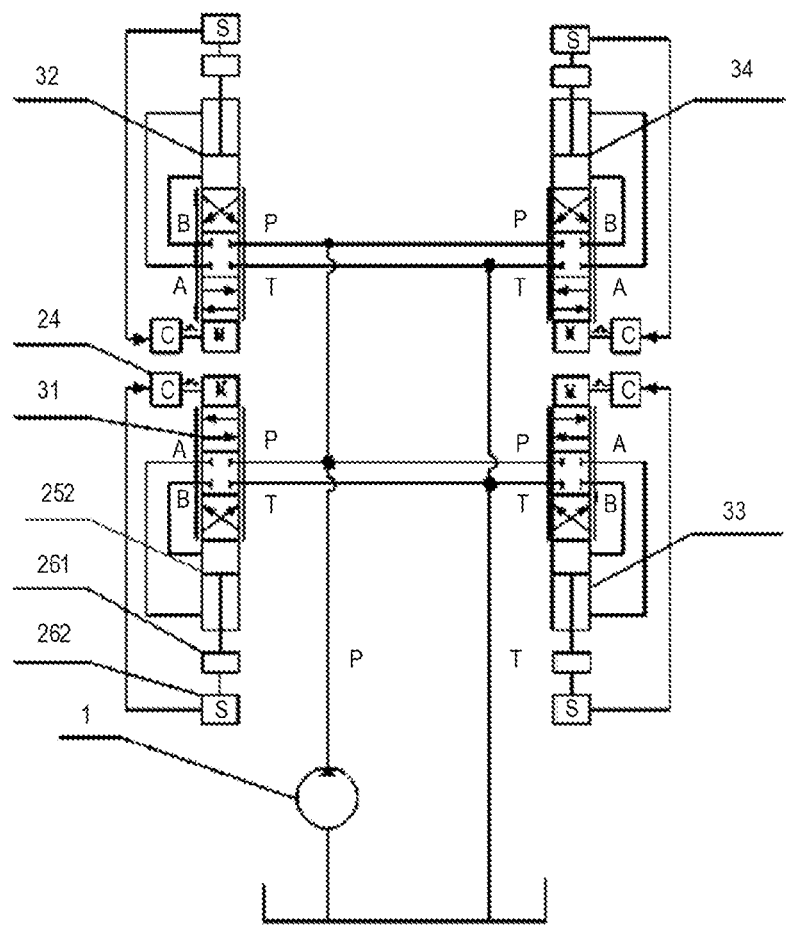
FIG. 1 is a schematic structural diagram of a hydraulic steering system according to some embodiments of the present disclosure.

REFERENCE NUMERALS 1, steering pump; 2, digital steering cylinder assembly; 21, steering cylinder; 211, rod cavity; 212, rodless cavity; 22, digital hydraulic valve; 23, motor; 24, controller; 25, internal feedback structure; 251, mechanical feedback structure; 252, piston structure; 26, sensor assembly; 261, connection conversion device; 262, speed sensor or displacement sensor; 27, coupling; 31, first digital steering cylinder assembly; 32, second digital steering cylinder assembly; 33, third digital steering cylinder assembly; 34, fourth digital steering cylinder assembly; A, first working oil port; B, second working oil port.

It should be appreciated that the sizes of various parts shown in the drawings are not drawn in accordance with actual proportional relationships. In addition, same or similar reference numerals represent same or similar components.

DESCRIPTION OF THE INVENTION

Technical solutions in the embodiments of the present disclosure will be described below clearly and completely in conjunction with the accompanying drawings in the embodiments of the present disclosure. Obviously, the described embodiments are only part of, instead of all of the embodiments of the present disclosure. The following description of at least one exemplary embodiment is actually only illustrative, and in no way serves as any limitation on the present disclosure and its application or use. Based on the embodiments in the present disclosure, all of other embodiments obtained by a person of ordinary skill in the art without creative work should fall into the protection scope of the present disclosure.

Unless specifically stated otherwise, the relative arrangement of components and steps, numerical expressions and numerical values set forth in these embodiments do not limit the scope of the present disclosure. Furthermore, it should be appreciated that, for ease of description, the sizes of various parts shown in the drawings are not drawn in accordance with actual proportional relationships. Technologies, methods, and devices known to those of ordinary skill in the related art may be not discussed in detail, but where appropriate, the technologies, methods, and device should be regarded as part of the specification as granted. In all examples shown and discussed here, any specific value should be interpreted as merely exemplary, rather than as a limitation. Therefore, other examples of an exemplary embodiment may have different values. It should be noted that similar reference numerals and letters denote similar items in the following drawings, so once a certain item is defined in one drawing, it does not need to be further discussed in subsequent drawings.

In relevant hydraulic independent steering systems known to the inventors, control is performed based on flow, and a steering pump, a steering control valve and a steering cylinder are connected with each other by a pipeline, which results in a long oil transfer distance, thus leading to problems such as a slow steering response, low control precision, a large steering lag and poor steering comfort. Moreover, the relevant hydraulic independent steering systems are mostly open-loop control systems with low steering precision, and especially their multi-axle synchronous steering precision cannot be guaranteed, which affects the safety of the steering system.

In addition, such a relevant hydraulic independent steering system is composed of steering cylinders, control valves, solenoid valves, pipelines, etc.; and the more steering modes there are, the more types of hydraulic elements are required and the more complex the structure is, such that the cost of constructing the hydraulic independent steering system is higher.

Figure 2:
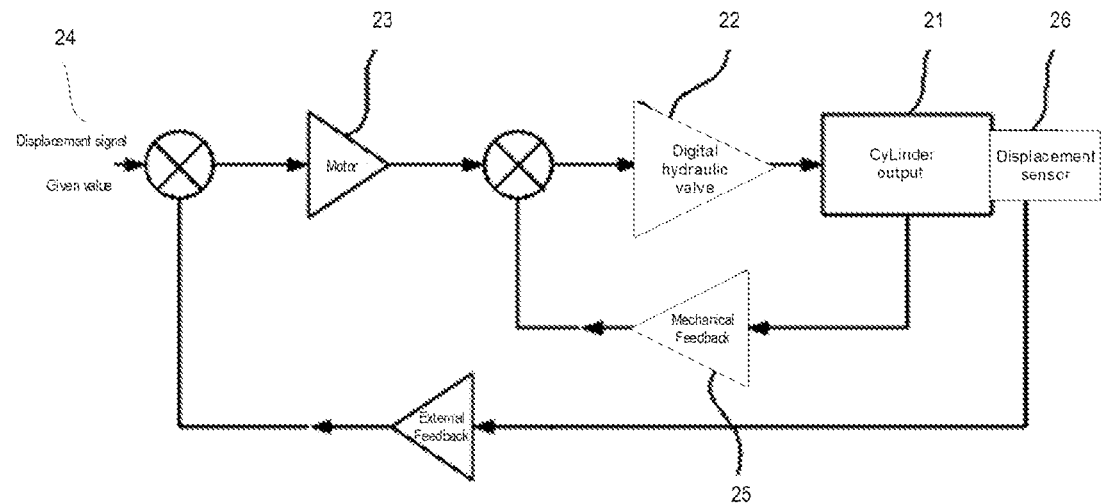
FIG. 2 is a schematic dual feedback system diagram of a hydraulic steering system according to some embodiments of the present disclosure.
Figure 3:
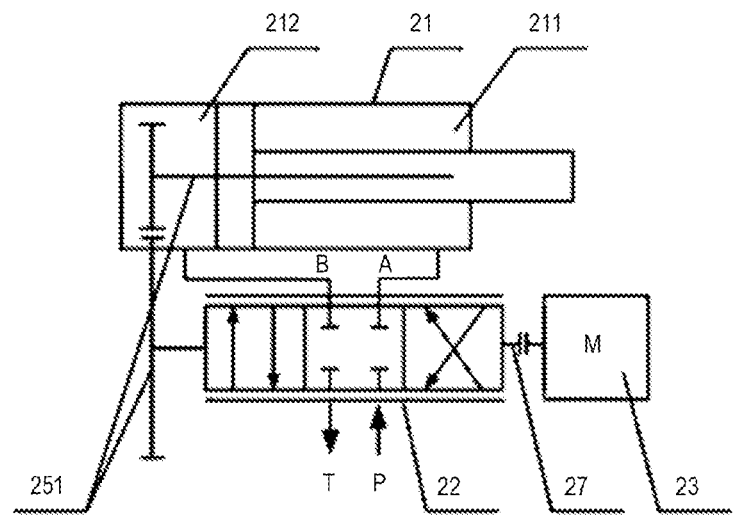
FIG. 3 is a schematic structural diagram of a digital steering cylinder assembly in a hydraulic steering system according to some embodiments of the present disclosure.

Based on this, FIG. 1 is a schematic structural diagram of a hydraulic steering system according to some embodiments of the present disclosure; FIG. 2 is a schematic dual feedback system diagram of a hydraulic steering system according to some embodiments of the present disclosure; FIG. 3 is a schematic structural diagram of a digital steering cylinder assembly in a hydraulic steering system according to some embodiments of the present disclosure; as shown in FIGS. 1 to 3, in an aspect of the present disclosure, there is provided a hydraulic steering system, including:

a steering pump 1; and
a plurality of digital steering cylinder assemblies 2, wherein at least one of the plurality of digital steering cylinder assemblies 2 includes:
a steering cylinder 21;
a digital hydraulic valve 22 having a valve core, configured to selectively communicate a rodless cavity 212 of the steering cylinder 21 with one of the steering pump 1 and a return oil circuit, and communicate a rod cavity 211 of the steering cylinder 21 with the other of the steering pump 1 and the return oil circuit;
a motor 23 in driving connection with the valve core of the digital hydraulic valve 22, and configured to receive a digital pulse signal and cause the valve core of the digital hydraulic valve 22 to move towards a first working position or a second working position; and
an internal feedback structure 25 connected between a piston rod of the steering cylinder 21 and the valve core of the digital hydraulic valve 22, and configured to, when the valve core of the digital hydraulic valve 22 moves towards the first working position or the second working position, be moved by the piston rod of the steering cylinder 21 to drive the valve core of the digital hydraulic valve 22 to move towards a neutral position.

The digital hydraulic valve 22 and the steering cylinder 21 together constitute a digital hydraulic cylinder assembly, whose operating characteristics are scalarized, or called digitalized, and in one-to-one correspondence with digital pulse signals. The frequency of the digital pulse signals corresponds to a movement speed of the cylinder, and the number of the digital pulse signals corresponds to a movement stroke of the cylinder. Therefore, the precision of the cylinder is almost not influenced and changed by external factors such as load, oil pressure or even leakage. The present disclosure uses a hydraulic steering system based on a digital hydraulic cylinder assembly, in place of flow control in the relevant steering system, thereby improving the speed of a control response.

The internal feedback structure 25 is connected between the piston rod of the steering cylinder 21 and the valve core of the digital hydraulic valve 22, thereby achieving fast and accurate displacement or speed closed-loop control of the digital steering cylinder assembly 2.

In order to improve the precision of control of the displacement or speed by the digital steering cylinder assembly 2, in some embodiments, the hydraulic steering system further includes:

a sensor assembly 26 configured to detect a stroke of the steering cylinder 21; and
a controller 24 built in at least one of the plurality of digital steering cylinder assemblies 2 or communicatively connected to the motor 23 and the sensor assembly 26 in the digital steering cylinder assembly 2, and configured to, when a detection result from the sensor is greater than a preset stroke, emit a digital pulse signal to drive the valve core of the digital hydraulic valve 22 to move toward the neutral position.

An external closed-loop feedback composed of the sensor assembly 26 and the controller 24, together with an internal feedback composed of the internal feedback structure 25, can, when the valve core of the digital hydraulic valve 22 moves to the first working position or the second working position under the drive of the motor 23, provide a feedback so that the valve core of the digital hydraulic valve 22 moves toward the neutral position, to avoid that the valve core cannot return in time to the neutral position after one time of driving by the motor 23, thereby affecting the subsequent driving action of the motor 23 on the valve core of the digital hydraulic valve 22.

In some embodiments, the digital hydraulic valve is connected to the steering cylinder through the internal feedback structure 25, the digital hydraulic valve 22 having a first working oil port communicated with the rod cavity 211 of the steering cylinder 21 and a second working oil port communicated with the rodless cavity 212 of the steering cylinder 21, the internal feedback structure 25 including:

a mechanical feedback structure, two ends of which are in driving connection with an inner hole of the piston rod and a side of the valve core close to the second working oil port, respectively.

The above embodiments are described specifically as follows in conjunction with FIG. 3.

The digital hydraulic valve 22 and the steering cylinder 21 are provided with a mechanical feedback structure 251 to form an internal mechanical feedback of the digital steering cylinder assembly 2. The digital hydraulic valve 22 includes a high-pressure oil port, a return oil port, the first working oil port and the second working oil port. A high-pressure oil port of the steering pump 1 is connected to the high-pressure oil port of the digital hydraulic valve 22, and the return oil port of the digital hydraulic valve 22 is connected to an oil tank. The first working oil port and the second working oil port of the digital hydraulic valve 22 are respectively connected to the rod cavity 211 and the rodless cavity 212 of the steering cylinder.

The controller 24 outputs a digital pulse signal to control the motor 23 to rotate, and the motor 23 drives, through a coupling 27, the digital hydraulic valve 22 to move to the right/left, and high-pressure oil from the steering pump 1 flows through the first working oil port/second working oil port and enters the rod cavity 211/rodless cavity 212 of the steering cylinder 21, thereby causing the steering cylinder 21 to retract or extend. At the same time, the steering cylinder 21 drives the mechanical feedback structure 251 in real time, and the mechanical feedback structure 251 provides a feedback in real time so that the digital hydraulic valve 22 moves to the left/right to close the first working oil port/second working oil port.

Hence, each digital pulse signal corresponds to a movement of the steering cylinder 21 of a preset displacement, and the movement position and the movement speed the steering cylinder 21 are only related to a pulse number and a pulse frequency, and the internal feedback mechanism as a real-time feedback has short response time, such that the control precision of the digital steering cylinder assembly 2 is higher.

In some embodiments, the digital hydraulic valve 22 has a first working oil port communicated with the rod cavity 211 of the steering cylinder 21 and a second working oil port communicated with the rodless cavity 212 of the steering cylinder 21, and the internal feedback structure 25 comprises:

a piston structure, two ends of which are connected to a rodless cavity 212 side of the piston rod and a side of the valve core close to the second working oil port, respectively.

In conjunction with FIG. 1, motion control of an individual digital steering cylinder assembly 2 is described as follows using a first digital steering cylinder assembly 31 as an example:

Piston rod retraction motion of the individual digital steering cylinder 21: the controller 24 sets a movement position or a movement speed of piston rod retraction motion of the steering cylinder 21, and the motor 23 of the first digital steering cylinder assembly 31 receives a digital pulse signal emitted by the controller 24 and performs positive rotation, and drives, through the coupling 27, the valve core of the digital hydraulic valve 22 to move downward, such that the high-pressure oil port is communicated with the first working oil port to supply oil to the rod cavity 211 of the steering cylinder 21, and the return oil port is communicated with the second working oil port to drain oil from the rodless cavity 212 of the steering cylinder, and the piston rod of steering cylinder 21 retracts to cause an axle to rotate.

At this situation, the internal feedback structure 25 performs closed-loop feedback in real time, so that the valve core of the digital hydraulic valve 22 moves toward the neutral position, thereby achieving an accurate relationship between an individual digital pulse signal and a cylinder displacement. At the same time, the controller 24 receives, in real time, a stroke signal of the piston rod output from the sensor assembly 26 and compares the same with a set value, and causes the valve core of the digital hydraulic valve 22 to move toward the neutral position if the stroke signal exceeds the set value, thereby ensuring the precision of the movement position or the movement speed of the cylinder by using the real-time feedback from the sensor.

An extension motion process of the individual digital steering cylinder assembly 2 is reverse to the retraction motion process, and its feedback principle is similar and will not be described redundantly here.

In order to omit components such as steering control valves and solenoid valves, reduce hydraulic elements and piping connections, and simplify a control system, in some embodiments, the digital hydraulic valve 22 is adjacent to the steering cylinder 21, and the digital hydraulic valve 22, the steering cylinder 21 and the internal feedback structure 25 are arranged integratedly.

For example, in some embodiments, the digital hydraulic valve 22, the steering cylinder 21 and the internal feedback structure 25 have the same external valve body, thereby facilitating detachment, installation and maintenance of the digital steering cylinder assembly 2 as a whole.

In some embodiments, the digital pulse signal includes at least one of a pulse number signal and a pulse frequency signal, and the controller 24 is configured to control, by the pulse number signal, a displacement of the valve core of the digital hydraulic valve 22, or control, by the pulse frequency signal, a speed of the valve core of the digital hydraulic valve 22.

Correspondingly, in some embodiments, the sensor assembly 26 includes:

- a connection conversion device 261 fixedly connected to the piston rod of the steering cylinder 21; and
- at least one of a speed sensor 262 and a displacement sensor 262 to obtain the stroke of the steering cylinder 21 by detecting at least one of a speed and a displacement of the connection conversion device 261 and performing conversion.

In some embodiments, the hydraulic steering system further includes:

- a coupling 27 in transmission connection between the motor 23 and the valve core of the digital hydraulic valve 22.

Therefore, according to embodiments of the present disclosure, a dual closed-loop digital hydraulic technology with the internal feedback and the sensor external feedback is used to improve the control precision and the response speed of the steering control system, and an integrated design method is used to perform integrated design of control elements and actuating elements to reduce the signal transmission distance between the elements, and further improve the response speed and the control precision, while reducing the number of elements and lowering the cost.

In another aspect of the present disclosure, there is provided a traveling crane, including a hydraulic steering system in any embodiment described above.

In some embodiments, the plurality of digital steering cylinder assemblies 2 include a first digital steering cylinder assembly 31, a second digital steering cylinder assembly 32, a third digital steering cylinder assembly 33 and a fourth digital steering cylinder assembly 34 communicated with the same steering pump 1 and the same return oil circuit to independently control four steering wheels of the crane, respectively.

The number of the steering wheels of the moving crane is not limited to four. The moving crane is described below with four steering wheels as an example:

Based on the hydraulic steering system provided in the present disclosure, each steering wheel of the traveling crane can be steered independently. Hence, if the traveling crane needs steering of a minimum radius, it only needs to output a command, and emit a digital pulse signal by the controller to control two steering wheels of a front steering axle to deflect by an angle of the same amplitude to one side, and two steering wheels of a rear steering axle to deflect by an angle of the same amplitude to the other side at the same time, thus achieving the minimum radius steering of the traveling crane.

Control processes of such operations as crabbing, independent steering of a rear axle, and locked steering of middle and rear axles are similar to that of the minimum radius steering described above and will not be described redundantly here. Finally, it should be noted that the above embodiments are only used for describing rather than limiting the technical solutions of the present disclosure. Although the present disclosure is described in detail with reference to the preferred embodiments, those of ordinary skill in the art should understand that they still can make modifications to the specific implementations in the present disclosure or make equivalent substitutions to part of technical features thereof; and such modifications and equivalent substitutions should be encompassed within the scope of the technical solutions sought for protection in the present disclosure so long as they do not depart from the spirit of the technical solutions of the present disclosure.

The invention claimed is:

1. A hydraulic steering system, comprising:
    a steering pump;
    a plurality of digital steering cylinder assemblies, wherein at least one of the plurality of digital steering cylinder assemblies comprises:
        a steering cylinder;
        a digital hydraulic valve having a valve core, the valve core configured to selectively communicate a rodless cavity of the steering cylinder with one of the steering pump and a return oil circuit, and communicate a rod cavity of the steering cylinder with the other of the steering pump and the return oil circuit;
        a motor in driving connection with the valve core of the digital hydraulic valve, and configured to receive a digital pulse signal and cause the valve core of the digital hydraulic valve to move towards a first working position or a second working position;
        an internal feedback structure connected between a piston rod of the steering cylinder and the valve core of the digital hydraulic valve, and configured to, when the valve core of the digital hydraulic valve moves towards the first working position or the second working position, be moved by the piston rod of the steering cylinder to drive the valve core of the digital hydraulic valve to move towards a neutral position;
        a sensor assembly configured to detect a stroke of the steering cylinder; and
        a controller located in at least one of the plurality of digital steering cylinder assemblies or communicatively connected to the motor in the digital steering cylinder assembly and the sensor assembly, and configured to, when a detection result from the sensor is greater than a preset stroke, emit a digital pulse signal including at least one of a pulse number signal or a pulse frequency signal, the controller is configured to at least one of (1) adjust, by the pulse number signal, a displacement of the valve core of the digital hydraulic valve or (2) adjust, by the pulse frequency signal, a speed of the valve core of the digital hydraulic valve.

2. The hydraulic steering system according to claim 1, wherein the controller is configured to:
    emit the digital pulse signal, when the detection result from the sensor is greater than the preset stroke, to drive the valve core of the digital hydraulic valve to move toward the neutral position.

3. The hydraulic steering system according to claim 1, further comprising:
    a coupling in transmission connection between the motor and the valve core of the digital hydraulic valve.

4. A traveling crane, comprising a hydraulic steering system as claimed in claim 1.

5. The traveling crane according to claim 4, wherein the plurality of digital steering cylinder assemblies comprise a first digital steering cylinder assembly, a second digital steering cylinder assembly, a third digital steering cylinder assembly and a fourth digital steering cylinder assembly communicated with the same steering pump and the same return oil circuit respectively, so as to independently control four steering wheels of the crane, respectively.

6. The hydraulic steering system according to claim 1, wherein the digital hydraulic valve is fluidly connected to the steering cylinder through the internal feedback structure, the digital hydraulic valve having a first working oil port communicated with the rod cavity of the steering cylinder and a second working oil port communicated with the rodless cavity of the steering cylinder, the internal feedback structure comprises a mechanical feedback structure, two ends of which are in driving connection with an inner hole of the piston rod and a side of the valve core close to the second working oil port, respectively.

7. The hydraulic steering system according to claim 6, wherein the digital hydraulic valve is adjacent to the steering cylinder, and the digital hydraulic valve, the steering cylinder and the internal feedback structure are arranged integratedly.

8. The hydraulic steering system according to claim 1, wherein the digital hydraulic valve has a first working oil port communicated with the rod cavity of the steering cylinder and a second working oil port communicated with the rodless cavity of the steering cylinder, and the internal feedback structure comprises a piston structure, two ends of which are connected to a rodless cavity side of the piston rod and a side of the valve core close to the second working oil port, respectively.

9. The hydraulic steering system according to claim 1, wherein the sensor assembly comprises:
   a connection conversion device fixedly connected to the piston rod of the steering cylinder; and
   at least one of a speed sensor and a displacement sensor, for obtaining the stroke of the steering cylinder by detecting at least one of a speed and a displacement of the connection conversion device and performing conversion.

* * * * *